US012011039B2

(12) United States Patent
Mironov et al.

(10) Patent No.: US 12,011,039 B2
(45) Date of Patent: *Jun. 18, 2024

(54) CARTRIDGE FOR AN AEROSOL-GENERATING SYSTEM

(71) Applicant: Philip Morris Products S.A., Neuchatel (CH)

(72) Inventors: Oleg Mironov, Neuchatel (CH); Jean-Marc Widmer, Lignieres (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,094

(22) Filed: Jun. 15, 2022

(65) Prior Publication Data

US 2022/0312839 A1 Oct. 6, 2022

Related U.S. Application Data

(63) Continuation of application No. 17/469,183, filed on Sep. 8, 2021, now Pat. No. 11,382,355, which is a (Continued)

(30) Foreign Application Priority Data

Apr. 30, 2015 (EP) .................................... 15166063

(51) Int. Cl.

*A24F 40/10* (2020.01)
*A24F 40/42* (2020.01)
(Continued)

(52) U.S. Cl.

CPC .............. *A24F 40/42* (2020.01); *A24F 40/46* (2020.01); *A24F 40/485* (2020.01); *A24F 40/70* (2020.01); *H05B 3/26* (2013.01); *A24F 40/10* (2020.01)

(58) Field of Classification Search

CPC .......... A24F 40/10; A24F 40/42; A24F 40/46; A24F 40/485; A24F 40/70; H05B 3/26
See application file for complete search history.

(56) References Cited

U.S. PATENT DOCUMENTS 3,232,268 A * 2/1966 Price ...................... A24D 3/022 28/247
6,125,853 A * 10/2000 Susa ....................... A24F 40/46 131/194
(Continued)

FOREIGN PATENT DOCUMENTS

CN 101116542 A 2/2008
CN 101132823 A 2/2008
(Continued)

OTHER PUBLICATIONS

Japanese Office Action dated Aug. 22, 2022 in Japanese Patent Application No. 2021-089890 (with English translation), citing document 15 therein, 4 pages.
(Continued)

*Primary Examiner* — Abdullah A Riyami
*Assistant Examiner* — Thang H Nguyen
(74) *Attorney, Agent, or Firm* — Oblon, McClelland, Maier & Neustadt, L.L.P.

(57) ABSTRACT

A cartridge for an aerosol-generating system is provided, the cartridge including: a liquid storage portion including a housing with a first opening, to contain a liquid aerosol-forming substrate; and a heater assembly including an electrically insulating support having a second opening, an electrical heating element supported by the insulating support and to heat the substrate to form an aerosol, and first and second electrically conductive contact portions disposed at opposite sides of the second opening and to connect to electrical connectors of a battery to supply power to the heater assembly, and a capillary material having first and
(Continued)

second faces, the first face being in physical contact with the heating element and the second face being opposite the first face, the capillary material to convey the substrate to the heating element by capillary action, the heater assembly being connected to the housing of the liquid storage portion.

18 Claims, 8 Drawing Sheets

Related U.S. Application Data continuation of application No. 17/351,541, filed on Jun. 18, 2021, now Pat. No. 11,839,237, which is a continuation of application No. 16/877,244, filed on May 18, 2020, now Pat. No. 11,064,737, which is a continuation of application No. 15/568,679, filed as application No. PCT/EP2016/059569 on Apr. 28, 2016, now Pat. No. 10,779,572.

(51) Int. Cl.

| | |
|---|---|
| ***A24F 40/46*** | (2020.01) |
| ***A24F 40/485*** | (2020.01) |
| ***A24F 40/70*** | (2020.01) |
| ***H05B 3/26*** | (2006.01) |

(56) References Cited

U.S. PATENT DOCUMENTS

| | | | | |
|---|---|---|---|---|
| 8,881,737 | B2 * | 11/2014 | Collett | A24F 40/30 131/194 |
| 9,814,265 | B2 * | 11/2017 | Rinker | A24F 40/46 |
| 10,015,990 | B2 * | 7/2018 | Mironov | A61M 11/042 |
| 10,660,369 | B2 * | 5/2020 | Fursa | A61M 15/06 |
| 10,709,173 | B2 * | 7/2020 | Monsees | A24F 40/42 |
| 10,777,091 | B2 * | 9/2020 | Pandolfino | A24F 40/50 |
| 10,842,192 | B2 * | 11/2020 | Mironov | H05B 3/347 |
| 2008/0092912 | A1 | 4/2008 | Robinson et al. | |
| 2009/0151717 | A1 * | 6/2009 | Bowen | A61M 15/0041 128/200.23 |
| 2011/0126848 | A1 * | 6/2011 | Zuber | A24F 40/46 131/329 |
| 2011/0226236 | A1 | 9/2011 | Buchberger | |
| 2011/0253798 | A1 | 10/2011 | Tucker et al. | |
| 2011/0309157 | A1 * | 12/2011 | Yang | A61M 11/042 239/6 |
| 2013/0306064 | A1 | 11/2013 | Thorens et al. | |
| 2014/0060554 | A1 * | 3/2014 | Collett | A24F 40/30 392/386 |
| 2014/0182610 | A1 | 7/2014 | Liu | |
| 2014/0238422 | A1 * | 8/2014 | Plunkett | A24F 40/50 131/328 |
| 2014/0305454 | A1 | 10/2014 | Rinker et al. | |
| 2014/0314397 | A1 * | 10/2014 | Alima | A24F 40/46 392/386 |
| 2014/0346689 | A1 | 11/2014 | Dubief | |
| 2014/0366898 | A1 * | 12/2014 | Monsees | A24F 40/30 131/329 |
| 2015/0027459 | A1 | 1/2015 | Collett et al. | |
| 2015/0068542 | A1 | 3/2015 | Chang et al. | |
| 2015/0090279 | A1 | 4/2015 | Chen | |
| 2015/0101606 | A1 * | 4/2015 | White | A61M 15/00 131/194 |
| 2015/0136156 | A1 | 5/2015 | Liu | |
| 2016/0073695 | A1 * | 3/2016 | Sears | H05B 3/46 131/329 |
| 2016/0353801 | A1 * | 12/2016 | Zinovik | A24F 40/42 |
| 2016/0353802 | A1 * | 12/2016 | Malgat | A24F 40/42 |
| 2017/0027226 | A1 * | 2/2017 | Mironov | A61M 11/042 |
| 2017/0280778 | A1 * | 10/2017 | Force | A24F 40/42 |
| 2017/0360093 | A1 * | 12/2017 | Fernando | A24F 40/485 |
| 2018/0014575 | A1 | 1/2018 | Fursa | |
| 2020/0085106 | A1 | 3/2020 | Mironov | |

FOREIGN PATENT DOCUMENTS

| | | | |
|---|---|---|---|
| CN | 201900065 | U | 7/2011 |
| CN | 102573968 | A | 7/2012 |
| CN | 102665306 | A | 9/2012 |
| CN | 103285488 | A | 9/2013 |
| CN | 103932401 | A | 7/2014 |
| CN | 203986095 | U | 12/2014 |
| CN | 203986096 | U | 12/2014 |
| CN | 204070542 | U | 1/2015 |
| CN | 204070557 | U | 1/2015 |
| CN | 204317492 | U | 5/2015 |
| EP | 2 460 422 | A1 | 6/2012 |
| EP | 2 633 875 | A2 | 9/2013 |
| EP | 3 104 721 | B1 | 10/2020 |
| JP | 59-33781 | A | 2/1984 |
| JP | 59-117404 | U | 8/1984 |
| JP | 2005-166269 | A | 6/2005 |
| JP | 2014-527835 | A | 10/2014 |
| JP | 2015-057078 | A | 3/2015 |
| JP | 2015-509718 | A | 4/2015 |
| JP | 6892828 | B2 | 6/2021 |
| KR | 10-2013-0046826 | | 5/2013 |
| KR | 20-2013-0006714 | U | 11/2013 |
| RU | 2 360 583 | C1 | 7/2009 |
| RU | 2 465 791 | C1 | 11/2012 |
| WO | 2005/027578 | A1 | 3/2005 |
| WO | 2011/045672 | A1 | 4/2011 |
| WO | 2011/137453 | A2 | 11/2011 |
| WO | 2013/083634 | A1 | 6/2013 |
| WO | 2013/159245 | A1 | 10/2013 |
| WO | 2014/130772 | A1 | 8/2014 |
| WO | WO 2014/130692 | A1 | 8/2014 |
| WO | 2014/153515 | A1 | 9/2014 |
| WO | 2016/096494 | A1 | 12/2014 |
| WO | 2015/066127 | A1 | 5/2015 |
| WO | WO 2015/117701 | A1 | 8/2015 |
| WO | WO 2015/117704 | A1 | 8/2015 |

OTHER PUBLICATIONS

Combined Office Action and Search Report dated Jun. 27, 2019 in Russian Patent Application No. 2017134972, citing documents AF and AP-AR therein, 19 pages (with English translation.

International Search Report and Written Opinion dated Jul. 26, 2016 in PCT/EP2016/059569, filed Apr. 28, 2016.

Office Action dated Aug. 15, 2018 in European Patent Application No. 16 719 088.3.

Japanese Office Action dated May 25, 2020 in corresponding Japanese Patent Application No. 2017-553364 (with English translation), citing references BK-BO therein, 11 pages.

Chinese Office Action dated Sep. 2, 2020 in corresponding Chinese Patent Application No. 2016800228532 (with English translation), citing documents BP and BQ therein, 20 pages European Office Action dated Nov. 17, 2020 in corresponding European Patent Application No. 167190883, citing document BR therein, 8 pages Indian Office Action dated Dec. 15, 2020 in corresponding Indian Patent Application No. 201717029160 (with English translation), citing document BS therein, 5 pages Office Action dated Jun. 10, 2020 in U.S. Appl. No. 16/877,244 citing references AK, AM, AN and BA-BC therein (13 pages)

Chinese Office Action and Search Report with English translation dated Dec. 24, 2019 in corresponding Chinese Patent Application No. 201680022853.2, citing documents BT-BV and CI therein (11 pages).

Combined Chinese Office Action and Search Report dated Jul. 6, 2021 in corresponding Chinese Patent Application No. 201680022853.2 (with English translation), citing documents CM and ON therein, 34 pages.

Extended European Search Report dated May 22, 2023 in European Patent Application No. 222092058, citing documents 1 and 15 therein, 12 pages.

* cited by examiner

CARTRIDGE FOR AN AEROSOL-GENERATING SYSTEM

CROSS-REFERENCE TO RELATED APPLICATIONS

This application is a continuation of and claims benefit under 35 U.S.C. § 120 to U.S. application Ser. No. 17/469,183, filed Sep. 8, 2021, which is a continuation of and claims benefit under 35 U.S.C. § 120 to U.S. application Ser. No. 17/351,541, filed Jun. 18, 2021, which is a continuation of and claims benefit under 35 U.S.C. § 120 to U.S. application Ser. No. 16/877,244, filed May 18, 2020 (now U.S. Pat. No. 11,064,737), which is a continuation of and claims benefit under 35 U.S.C. § 120 to U.S. application Ser. No. 15/568,679, filed Oct. 23, 2017 (now U.S. Pat. No. 10,779,572), which is a U.S. National Stage application of PCT/EP2016/059569, filed Apr. 28, 2016, and claims the benefit of priority under 35 U.S.C. § 119 to European Application No. 15166063.6, filed Apr. 30, 2015, each of these documents being incorporated herein by reference in their entireties.

TECHNICAL FIELD

The present invention relates to aerosol-generating systems and to cartridges for aerosol-generating systems, the cartridges comprising a heater assembly that is suitable for vaporising an aerosol-forming substrate. In particular, the invention relates to handheld aerosol-generating systems, such as electrically operated smoking systems. Aspects of the invention relate to cartridges for an aerosol-generating system and to methods for manufacturing those cartridges.

DESCRIPTION OF THE RELATED ART

One type of aerosol-generating system is an electrically operated smoking system. Handheld electrically operated smoking systems consisting of a device portion comprising a battery and control electronics, and a cartridge portion comprising a supply of aerosol-forming substrate, and an electrically operated vapouriser, are known. A cartridge comprising both a supply of aerosol-forming substrate and a vapouriser is sometimes referred to as a “cartomiser”. The vapouriser is typically a heater assembly. In some known examples, the aerosol-forming substrate is a liquid aerosol-forming substrate and the vapouriser comprises a coil of heater wire wound around an elongate wick soaked in liquid aerosol-forming substrate. The cartridge portion typically comprises not only the supply of aerosol-forming substrate and an electrically operated heater assembly, but also a mouthpiece, which the user sucks on in use to draw aerosol into their mouth.

Thus, electrically operated smoking systems that vaporize an aerosol-forming liquid by heating to form an aerosol typically comprise a coil of wire that is wrapped around a capillary material that holds the liquid. Electric current passing through the wire causes resistive heating of the wire which vaporises the liquid in the capillary material. The capillary material is typically held within an airflow path so that air is drawn past the wick and entrains the vapour. The vapour subsequently cools to form an aerosol.

This type of system can be effective at producing aerosol but it can also be challenging to manufacture in a low cost and repeatable way. Furthermore, the wick and coil assembly, together with associated electrical connections, can be fragile and difficult to handle.

It would be desirable to provide a cartridge suitable for an aerosol-generating system, such as a handheld electrically operated smoking system, that has a heater assembly which is inexpensive to produce and is robust. It would be further desirable to provide a cartridge for an aerosol-generating system with a heater assembly that is as efficient or more efficient than prior heater assemblies in aerosol-generating systems.

SUMMARY

According to a first aspect of the present invention, there is provided a cartridge for use in an aerosol-generating system, comprising: a storage portion comprising a housing for holding an aerosol-forming substrate, the housing having an opening; and a heater assembly comprising at least one heater element fixed to the housing and extending across the opening of the housing, wherein the at least one heater element of the heater assembly has a plurality of apertures for allowing fluid to pass through the at least one heater element, and wherein the plurality of apertures have different sizes.

BRIEF DESCRIPTION OF THE DRAWINGS

Embodiments of the invention will now be described, by way of example only, with reference to the accompanying drawings, in which.

DETAILED DESCRIPTION

Figure 1A:
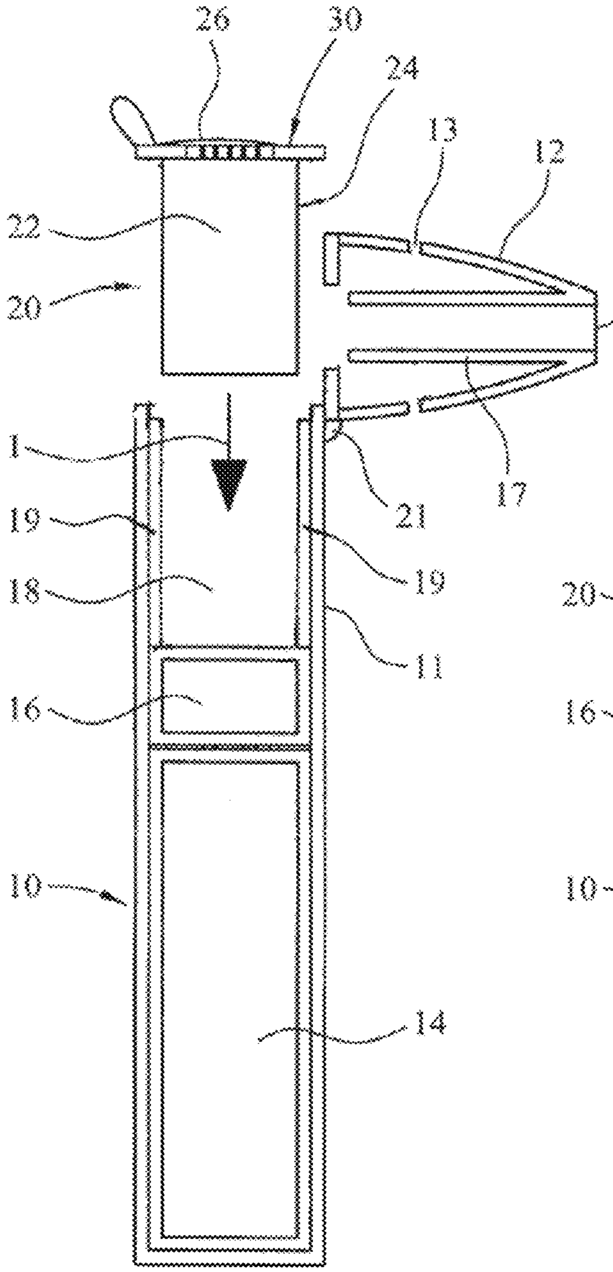
FIGS. 1A to 1D are schematic illustrations of a system, incorporating a cartridge, in accordance with an embodiment of the invention.

By providing the at least one heater element with a plurality of apertures for allowing fluid to pass through the at least one heater element, the at least one heater element is fluid permeable. This means that the aerosol-forming substrate, in a gaseous phase and possibly in a liquid phase, can readily pass through the at least one heater element and, thus, the heater assembly.

By varying the size of the apertures, the fluid flow through the heater element may be altered as desired, for example to provide improved aerosol characteristics. For example, the quantity of aerosol drawn through the heater assembly may be altered by using apertures with different sizes.

As used herein, the terms “vary”, “varies”, “differ”, “differs” and “different” refer to a deviation beyond that of standard manufacturing tolerances and in particular to values that deviate from each other by at least 5 percent. This includes, but is not limited to, embodiments in which the size of the majority of the apertures is substantially the same and a small number of apertures, for example one or two apertures, have a size which differs, as well as embodiments in which any suitable number of the apertures, for example at least 5 percent of the apertures, have a size which differs from that of the remaining apertures.

As used herein, “electrically conductive” means formed from a material having a resistivity of $1\times10^{-4}$ Ωm, or less. As used herein, “electrically insulating” means formed from a material having a resistivity of $1\times10^{4}$ Ωm or more.

In certain preferred embodiments, the size of the apertures in a first region of the opening is larger than the size of the apertures in a second region of the opening. This advantageously allows the fluid flow through the at least one heater element, and thus through the heater assembly, to be selected as desired by arranging the first and second regions based on the characteristics of the aerosol-generating system. For example, the size of the apertures in the first and second regions, or the relative position of the first and second regions can be selected based on the air flow characteristics of the aerosol-generating system, or on the temperature profile of the heater assembly, or both. In some embodiments, the first region may be positioned towards the centre of the opening relative to the second region. In other embodiments, the second region may be positioned towards the centre of the opening relative to the first region The size of the apertures may gradually change between the first and second regions of the opening. Alternatively, or in addition, the size of the apertures may increase in a stepwise fashion between the first and second regions of the opening. Where the size of the apertures gradually changes between the first and second regions of the opening, the apertures are preferably formed by etching.

In some embodiments, the size of the apertures decreases towards a centre portion of the opening. With this arrangement, the fluid flow through the centre portion of the opening is decreased relative to the periphery of the opening. This may be advantageous depending on the temperature profile of the heater assembly or on the airflow characteristics of the aerosol-generating system with which the cartridge is intended for use. This includes embodiments in which the size of the apertures decreases in two dimensions towards a centre portion of the opening, that is, in the direction of both the height and the width of the opening, as well as embodiments in which the size of the apertures decreases in only one dimension towards a centre portion of the opening.

In some embodiments, the heater assembly comprises a plurality of heater elements extending across the width of the opening, wherein the heater element or elements extending closest to the centre portion of the opening comprise a plurality of apertures having a size which is less than the size of the apertures of the other heater elements in the heater assembly. In one particular embodiment, the heater assembly comprises three heater elements extending across the width of the opening, wherein the middle heater element comprises a plurality of apertures having a size which is less than the size of the apertures of the two outer heater elements.

In certain preferred embodiments, the size of the apertures increases towards a centre portion of the opening. In other words, the size of at least one aperture towards the centre of the opening is larger than the size of at least one aperture further from the centre of the opening. This arrangement enables more aerosol to pass through the heater element in the centre of the opening and may be advantageous in cartridges in which the centre of the opening is the most important vaporization area, for example in cartridges in which the temperature of the heater assembly is higher in the centre of the opening. This includes embodiments in which the size of the apertures increases in two dimensions towards a centre portion of the opening, that is, in the direction of both the height and the width of the opening, as well as embodiments in which the size of the apertures increases in only one dimension towards a centre portion of the opening.

In some embodiments, the heater assembly comprises a plurality of heater elements extending across the width of the opening, wherein the heater element or elements extending closest to the centre portion of the opening comprise a plurality of apertures having a size which is greater than the size of the apertures of the other heater elements in the heater assembly. In one particular embodiment, the heater assembly comprises three heater elements extending across the width of the opening, wherein the middle heater element comprises a plurality of apertures having a size which is greater than the apertures of the two outer heater elements.

As used herein, the term “centre portion” of the opening refers to a part of the opening that is away from the periphery of the opening and has an area which is less than the total area of the opening. For example, the centre portion may have an area of less than about 80 percent, preferably less than about 60 percent, more preferably less than about 40 percent, most preferably less than about 20 percent of the total area of the opening.

The plurality of apertures may comprise a first set of apertures having substantially the same size, and one or more further sets of apertures having a smaller size. In such embodiments, the first set of apertures may be located further from the centre portion of the opening relative to one or more of the further sets of apertures. In alternative embodiments, the first set of apertures may be located closer to the centre portion of the opening relative to the one or more further sets of apertures.

Alternatively, each of the apertures may have a different size.

The size of the plurality of apertures may gradually increase towards the centre of the opening. Alternatively, or in addition, the size of the apertures may increase in a stepwise fashion towards the centre of opening.

In any of the above embodiments, the mean size of the apertures located in the centre portion of the opening may be different to the mean size of the apertures outside of the centre portion of the opening. For example, the mean size of the apertures located in the centre portion of the opening may be less than the mean size of the apertures outside of the centre portion of the opening. Preferably, the mean size of the apertures located in the centre portion of the opening is greater than the mean size of the apertures outside of the centre portion of the opening. In certain preferred embodiments, the mean size of the apertures located in the central portion of the opening is at least 10 percent, preferably at least 20 percent, more preferably at least 30 percent greater than the mean size of the apertures outside of the central portion of the opening.

The at least one heater element may comprise one or more sheets of electrically conductive material from which material has been removed, for example by stamping or by etching, to form the plurality of apertures. In preferred embodiments, the at least one heater element comprises an array of electrically conductive filaments extending along the length of the at least one heater element, the plurality of apertures being defined by interstices between the electrically conductive filaments. In such embodiments, the size of the plurality of apertures may be varied by increasing or decreasing the size of the interstices between adjacent filaments. This may be achieved by varying the width of the electrically conductive filaments, or by varying the interval between adjacent filaments, or by varying both the width of the electrically conductive filaments and the interval between adjacent filaments.

Preferably at least a portion of the heater element is spaced apart from the periphery of the opening by a distance which is greater than a dimension of the interstices of that portion of the heater element.

As used herein, the term "filament" refers to an electrical path arranged between two electrical contacts. A filament may arbitrarily branch off and diverge into several paths or filaments, respectively, or may converge from several electrical paths into one path. A filament may have a round, square, flat or any other form of cross-section. In preferred embodiments, the filaments have a substantially flat cross-section. A filament may be arranged in a straight or curved manner.

The electrically conductive filaments may be substantially flat. As used herein, "substantially flat" preferably means formed in a single plane and for example not wrapped around or other conformed to fit a curved or other non-planar shape. A flat heater assembly can be easily handled during manufacture and provides for a robust construction.

The electrically conductive filaments define interstices between the filaments. In certain embodiments, the interstices have a width of from about 10 microns and about 100 microns, preferably from about 10 microns to about 60 microns. Preferably the filaments give rise to capillary action in the interstices, so that in use, material, for example liquid to be vaporized is drawn into the interstices, increasing the contact area between the heater assembly and the liquid.

The electrically conductive filaments may have a diameter of between 8 microns and 100 microns preferably between 8 microns and 50 microns, and more preferably between 8 microns and 39 microns. The filaments may have a round cross section or may have for example a flattened cross section. Preferably, the electrically conductive filaments are substantially flat. Where the electrically conductive filaments are substantially flat, the term "diameter" refers to the width of the electrically conductive filaments.

The electrically conductive filaments may have different diameters. This may allow the temperature profile of the heater element to be altered as desired, for example to increase the temperature of the heater element in the centre portion of the opening.

The area of the array of electrically conductive filaments of a single heater element may be small, preferably less than or equal to 25 millimetres squared, allowing it to be incorporated in to a handheld system. The heater element may, for example, be rectangular and have a length of about 5 millimetres and a width of about 2 millimetres. In some examples, the width is below 2 millimetres, for example the width is about 1 millimetre. The smaller the width of the heater elements, the more heater elements may be connected in series in the heater assembly of the present invention. An advantage of using smaller width heater elements that are connected in series is that the electric resistance of the combination of heater elements is increased.

The electrically conductive filaments may comprise any suitable electrically conductive material. Suitable materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, constantan, nickel-, cobalt-, chromium-, aluminium-, titanium-, zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation. The filaments may be coated with one or more insulators. Preferred materials for the electrically conductive filaments are 304, 316, 304L, and 316L stainless steel, and graphite.

The electrically conductive filaments may be unconnected along their respective lengths and connected only at each end. Such an arrangement may result in a high level of electrical efficiency. In certain preferred embodiments, the at least one heater element further comprises a plurality of transverse filaments extending transversely to the array of electrically conductive filaments and by which adjacent filaments in the array of electrically conductive filaments are connected, wherein the plurality of apertures is defined by the interstices between the electrically conductive filaments and the interstices between the transverse filaments.

The transverse filaments increase the rigidity or structural stability of the at least one heater element. This may reduce the risk of damage to the at least one heater element during assembly and use. It may also improve the ease of assembly of the heater assembly and improve manufacturing repeatability by reducing variations between different heater elements. The provision of a heater assembly of this type has several advantages over a conventional wick and coil arrangement. The heater assembly can be inexpensively produced, using readily available materials and using mass production techniques. The heater assembly is robust allowing it to be handled and fixed to other parts of the aerosol-generating system during manufacture, and in particular to form part of a removable cartridge.

The transverse filaments may extend in any suitable transverse direction and may or may not be substantially parallel to one another. For example, the transverse filaments may be substantially parallel to one another and arranged at an angle of from about 30 degrees to about 90 degrees from the array of electrically conductive filaments. In certain embodiments, the transverse filaments are substantially parallel to one another and extend substantially perpendicularly to the array of electrically conductive filaments.

Where the at least one heater element comprises a plurality of transverse filaments, the interstices between the transverse filaments may be substantially constant and the size of the apertures varied by varying the size of the interstices between filaments in the array of electrically conductive filaments. Preferably the interstices between the transverse filaments varies across the length, width, or length and width of the at least heater element such that the plurality of apertures have different lengths. Where the interstices between the transverse elements varies across the length of the at least one heater element, this may be achieved by varying the width of the transverse filaments, or by varying the interval between adjacent transverse filaments, or by varying both the width of the transverse filaments and the interval between adjacent transverse filaments.

The transverse filaments may have a diameter of between 8 microns and 100 microns preferably between 8 microns and 50 microns, and more preferably between 8 microns and 39 microns. The transverse filaments may have a round cross section or may have for example a flattened cross section. Preferably, the transverse filaments are substantially flat. Where the transverse filaments are substantially flat, the term “diameter” refers to the width of the electrically conductive filaments.

In preferred embodiments, the electrically conductive filaments and the transverse filaments have substantially the same diameter. In preferred embodiments, the electrically conductive filaments and the transverse filaments are both substantially flat.

One or more of the plurality of transverse filaments may extend across the entire width of the heater element. Alternatively, or in addition, at least some, preferably substantially all, of the plurality of transverse filaments extend across only part of the width of the at least one heater element. In such embodiments, two or more of the transverse filaments may be arranged in a co-axial relationship such that, together, those transverse filaments extend across the entire width of the at least heater element along a substantially straight line. In certain preferred embodiments, at least some, preferably substantially all, of the plurality of transverse filaments extend across only part of the width of the at least one heater element and are staggered along the length of the at least one heater element. In other words, successive transverse filaments across the width of the heater element are offset in the length direction of the heater element.

In certain preferred embodiments, at least some, preferably substantially all, of the plurality of transverse filaments extend across only a single interstice between two conductive filaments and are staggered along the length of the heater element. With this arrangement, the interval between subsequent transverse filaments along the length of each filament in the array is reduced, reducing the amount of each filament which is unsupported on either of its sides. Thus, the interstice between adjacent transverse filaments, and the length of the apertures can be increased without adversely affecting the strength or rigidity of the heater element. This may allow the fluid flow characteristics of the heater element and the aerosol delivery characteristics of the cartridge to be varied as desired without adversely affecting the rigidity or structural stability of the heater element.

The plurality of transverse filaments may be formed from any suitable material. For example, the plurality of transverse filaments may be formed from an electrically insulating material. In certain preferred embodiments, the transverse filaments are electrically conductive. In such embodiments, the transverse filaments may be formed from any of the materials described above in relation to the array of electrically conductive filaments. Preferably, the plurality of transverse filaments are formed from the same material as the array of electrically conductive filaments.

In certain preferred embodiments, at least some, preferably substantially all, of the plurality of transverse filaments are electrically conductive and extend across only a single interstice between two conductive filaments and are staggered along the length of the heater element. With this arrangement, the junctions between the filaments in the array and the transverse filaments each define three electrical paths. This is in contrast to a conventional mesh heater element in which the junctions between the filaments each define four electrical paths. Without wishing to be bound by any particular theory, it is thought that by reducing the number of electrically conductive transverse elements and, thus the number of electrical paths, the heater element of the present invention can better maintain current direction across the heater element, resulting in a reduction in the variability in temperature profile across the heater element area, leading to fewer hot spots, and that this may reduce the variability in performance.

Additionally, by staggering the transverse filaments along the length direction.

According to a second aspect of the present invention, there is provided a cartridge for use in an aerosol-generating system, comprising a storage portion comprising a housing for holding an aerosol-forming substrate, the housing having an opening; and a heater assembly comprising at least one heater element fixed to the housing and extending across the opening of the housing, wherein the at least one heater element of the heater assembly comprises an array of electrically conductive filaments extending along the length of the at least one heater element, and a plurality of transverse filaments extending transversely to the array of electrically conductive filaments by which adjacent filaments in the array of electrically conductive filaments are connected, wherein interstices between the electrically conductive filaments and interstices between the transverse filaments define a plurality of apertures for allowing fluid to pass through the at least one heater element, and wherein at least some, preferably substantially all, of the plurality of transverse filaments extend across only part of the width of the at least one heater element and are staggered along the length of the at least one heater element.

With this arrangement, the interval between subsequent transverse filaments along the length of each filament in the array is reduced, reducing the amount of each filament which is unsupported on either of its sides. Thus, the interstice between adjacent transverse filaments, and the length of the apertures can be increased without adversely affecting the strength or rigidity of the heater element. This may allow the fluid flow characteristics of the heater element and the aerosol delivery characteristics of the cartridge to be varied as desired without adversely affecting the rigidity or structural stability of the heater element.

The plurality of transverse filaments may be formed from any suitable material. For example, the plurality of transverse filaments may be formed from an electrically insulating material. In certain preferred embodiments, the transverse filaments are electrically conductive. In such embodiments, the transverse filaments may be formed from any of the materials described above in relation to the array of electrically conductive filaments. Preferably, the plurality of transverse filaments are formed from the same material as the array of electrically conductive filaments.

In certain preferred embodiments, at least some, preferably substantially all, of the plurality of transverse filaments are electrically conductive.

With this arrangement, the junctions between the filaments in the array and the transverse filaments each define three electrical paths. This is in contrast to a conventional mesh heater element in which the junctions between the filaments each define four electrical paths. Without wishing to be bound by any particular theory, it is thought that by reducing the number of electrically conductive transverse elements and, thus the number of electrical paths, the heater element of the present invention can better maintain current direction across the heater element, resulting in a reduction in the variability in temperature profile across the heater element area, leading to fewer hot spots, and that this may reduce the variability in performance One or more of the plurality of electrically conductive transverse filaments may extend across the entire width of the heater element. In certain preferred embodiments, at least some, preferably substantially all, of the plurality of transverse filaments extend across only a single interstice between two conductive filaments and are staggered along the length of the heater element.

With this arrangement, the structural stability of the at least one heater element can be increased or maintained using fewer transverse filaments, since the interval between subsequent transverse filaments along the length and on either side of each filament in the array is reduced for a given number of transverse filaments. Thus, the interstice between adjacent transverse filaments, and the length of the apertures can be increased without adversely affecting the strength or rigidity of the heater element.

In any of the above embodiments, where the heater element comprises an array of electrically conductive filaments and a plurality of transverse filaments, these filaments preferably each have a diameter of from about 8 microns to about 100 microns, preferably from about 8 microns to about 50 microns, more preferably from about 8 microns to about 30 microns. The filaments may have a round cross section or may have for example a flattened cross section. Preferably, the electrically conductive filaments and the transverse filaments are substantially flat. Where the filaments are substantially flat, the term "diameter" refers to the width of the filament. Where the filaments are substantially flat, the at least one heater element preferably comprises one or more sheets of electrically conductive material from which material has been removed, for example by stamping or by etching, to form the filaments.

The electrically conductive filaments or the plurality of transverse filaments, or both, may have different diameters. This may allow the temperature profile of the heater element to be altered as desired, for example to increase the temperature of the heater element in the centre portion of the opening.

In any of the above embodiments, the plurality of apertures may have any suitable size or shape. In some embodiments, each of the plurality of apertures is elongate in the length direction of the heater element. Advantageously, by being elongate in the length direction of the heater element, the current direction through the heater element may be better maintained. In such embodiments, the plurality of apertures may each have a width of from about 10 microns to about 100 microns, preferably from about 10 microns to about 60 microns. Using apertures with these approximate dimensions allows a meniscus of aerosol-forming substrate to be formed in the apertures, and for the heater element of the heater assembly to draw aerosol-forming substrate by capillary action.

The cartridge comprises a storage portion comprising a housing for holding an aerosol-forming substrate, wherein the heater assembly includes at least one heater element fixed to the housing of the storage portion. The housing may be a rigid housing and impermeable to fluid. As used herein "rigid housing" means a housing that is self-supporting. The rigid housing of the storage portion preferably provides mechanical support to the heater assembly.

The housing of the storage portion may contain a capillary material and the capillary material may extend into the interstices between the filaments.

The capillary material may have a fibrous or spongy structure. The capillary material preferably comprises a bundle of capillaries. For example, the capillary material may comprise a plurality of fibres or threads or other fine bore tubes. The fibres or threads may be generally aligned to convey liquid to the heater. Alternatively, the capillary material may comprise sponge-like or foam-like material. The structure of the capillary material forms a plurality of small bores or tubes, through which the liquid can be transported by capillary action. The capillary material may comprise any suitable material or combination of materials. Examples of suitable materials are a sponge or foam material, ceramic- or graphite-based materials in the form of fibres or sintered powders, foamed metal or plastics material, a fibrous material, for example made of spun or extruded fibres, such as cellulose acetate, polyester, or bonded polyolefin, polyethylene, terylene or polypropylene fibres, nylon fibres or ceramic. The capillary material may have any suitable capillarity and porosity so as to be used with different liquid physical properties. The liquid has physical properties, including but not limited to viscosity, surface tension, density, thermal conductivity, boiling point and vapour pressure, which allow the liquid to be transported through the capillary device by capillary action.

The capillary material may be in contact with the electrically conductive filaments. The capillary material may extend into interstices between the filaments. The heater assembly may draw aerosol-forming substrate into the interstices by capillary action. The capillary material may be in contact with the electrically conductive filaments over substantially the entire extent of the opening.

The housing may contain two or more different capillary materials, wherein a first capillary material, in contact with the at least one heater element, has a higher thermal decomposition temperature and a second capillary material, in contact with the first capillary material but not in contact with the at least one heater element has a lower thermal decomposition temperature. The first capillary material effectively acts as a spacer separating the heater element from the second capillary material so that the second capillary material is not exposed to temperatures above its thermal decomposition temperature. As used herein, "thermal decomposition temperature" means the temperature at which a material begins to decompose and lose mass by generation of gaseous by products. The second capillary material may advantageously occupy a greater volume than the first capillary material and may hold more aerosol-forming substrate that the first capillary material. The second capillary material may have superior wicking performance to the first capillary material. The second capillary material may be a less expensive or have a higher filling capability than the first capillary material. The second capillary material may be polypropylene.

The first capillary material may separate the heater assembly from the second capillary material by a distance of at least 1.5 millimetres, and preferably between 1.5 millimetres and 2 millimetres in order to provide a sufficient temperature drop across the first capillary material.

The opening of the cartridge has a width and a length dimension. The at least one heater element extends across the full length dimension of the opening of the housing. The width dimension is the dimension perpendicular to the length dimension in the plane of the opening. Preferably the at least one heater element of the heater assembly has a width that is smaller than the width of the opening of the housing.

Preferably a part of the heater element is spaced apart from the perimeter of the opening. Where the heater element comprises a strip attached to the housing at each end, preferably the sides of the strip do not contact the housing. Preferably there is a space between the sides of the strip and the perimeter of the opening.

The width of the heater element may be less than the width of the opening in at least a region of the opening. The width of the heater element may be less than the width of the opening in all of the opening.

The width of the at least one heater element of the heater assembly may be less than 90 percent, for example less than 50 percent, for example less than 30 percent, for example less than 25 percent of the width of the opening of the housing.

The area of the at least one heater element may be less than 90 percent, for example less than 50 percent, for example less than 30 percent, for example less than 25 percent of the area of the opening of the housing. The area of the heater elements of the heater assembly may be for example between 10 percent and 50 percent of the area of the opening, preferably between 15 and 25 percent of the area of the opening.

The open area of the at least one heater element, which is the ratio of the area of the apertures to the total area of the heater element is preferably from about 25 percent to about 56 percent.

The heater element preferably is supported on an electrically insulating substrate. The insulating substrate preferably has an opening defining the opening of the housing. The opening may be of any appropriate shape. For example the opening may have a circular, square or rectangular shape. The area of the opening may be small, preferably less than or equal to about 25 millimetres squared.

The electrically insulating substrate may comprise any suitable material, and is preferably a material that is able to tolerate high temperatures (in excess of 300 degree Celsius) and rapid temperature changes. An example of a suitable material is a polyimide film, such as Kapton®. The electrically insulating substrate may be a flexible sheet material. The electrically conductive contact portions and electrically conductive filaments may be integrally formed with one another.

The at least one heater element is preferably arranged in such a way that the physical contact area with the substrate is reduced compared with a case in which the heater elements of the heater assembly is in contact around the whole of the periphery of the opening. The at least one heater element preferably does not directly contact the perimeter window side walls of the opening. In this way thermal contact to the substrate is reduced and heat losses to the substrate and further adjacent elements of the aerosol-generating system are reduced.

Without wishing to be bound by any particular theory, it is believed that by spacing the heater element away from the housing opening, less heat is transferred to the housing, thus increasing efficiency of heating and therefore aerosol generation. It is also thought that where the heating element is close to or in contact with the periphery of the opening, there is heating of material which is located away from the opening. This heating is thought to lead to inefficiency because such heated material away from the opening is not able to be utilised in the formation of the aerosol. By spacing the heating element away from the periphery of the opening in the housing, more efficient heating of the material, or production of the aerosol may be obtainable.

The spacing between the heater element and the opening periphery is preferably dimensioned such that the thermal contact is significantly reduced. The spacing between the heater element and the opening periphery may be between 25 microns and 40 microns.

The aerosol generating system may be an electrically operated smoking system.

The substrate preferably comprises at least first and second electrically conductive contact portions for contacting the at least one heater element, the first and second electrically conductive contact portions positioned on opposing sides of the opening to one another, wherein the first and second electrically conductive contact portions are configured to allow contact with an external power supply.

The heater assembly may comprise a single heater element, or a plurality of heater elements connected in parallel. Preferably, the heater assembly comprises a plurality of heater elements connected in series. Where the substrate comprises at least first and second electrically conductive contact portions for contacting the at least one heater element, the first and second electrically conductive contact portions may be arranged such that the first contact portion contacts the first heater element and the second contact portion contacts the last heater element of the serially connected heater elements. Additional contact portions are provided at the heater assembly to allow for serial connection of all heater elements. Preferably these additional contact portions are provided at each side of the opening of the substrate.

Where the heater assembly includes a plurality of heater elements, two or more of the plurality of heater elements may define a plurality of apertures having substantially the same size. Alternatively, or in addition, the heater assembly may comprise a first heater element defining a plurality of apertures having a first size and a second heater element defining a plurality of apertures having a second size, wherein the first and second sizes are different. For example, the heater assembly may comprise three heater elements, two of which define a plurality of apertures having a first size and the remaining one of which defines a plurality of apertures having a second size which is different to the first size. In some embodiments, the heater assembly includes a plurality of heater elements, each defining a plurality of apertures having a different size to the of other heater elements.

Preferably, where the heater assembly includes a plurality of heater elements, the heater elements are spatially arranged substantially in parallel to each other. Preferably the heater elements are spaced apart from each other. Without wishing to be bound by any particular theory, it is thought that spacing the heater elements apart from each other may give more efficient heating. By appropriate spacing of the heater elements for example, a more even heating across the area of the opening may be obtained compared with for example where a single heating element having the same area is used.

In a particular preferred embodiment, the heater assembly comprises an odd number of heater elements, preferably three or five heater elements, and the first and second contact portions are located on opposite sides of the opening of the substrate. This arrangement has the advantage that the first and second contact portions are arranged on opposite sides of the aperture.

The heater assembly may alternatively comprise an even number of heater elements, preferably two or four heater elements. In this embodiment the contact portions are preferably located on the same side of the cartridge. With this arrangement a rather compact design of the electric connection of the heater assembly to the power source may be achieved.

In some examples, the at least one heater element has a first face that is fixed to the electrically insulating substrate and the first and second electrically conductive contact portions are configured to allow contact with an external power supply on a second face of the heater element opposite to the first face.

The provision of electrically conductive contact portions forming part of the heater element allows for reliable and simple connection of the heater assembly to a power supply.

Where the heater assembly includes a plurality of heater elements, at least one of the plurality of heater elements may comprise a first material and at least one other of the plurality of heater elements may comprise a second material different from the first material. This may be beneficial for electrical or mechanical reasons. For example, one or more of the heater elements may be formed from a material having a resistance that varies significantly with temperature, such as an iron aluminium alloy. This allows a measure of resistance of the heater elements to be used to determine temperature or changes in temperature. This can be used in a puff detection system and for controlling heater temperature to keep it within a desired temperature range.

The electrical resistance of the heater assembly is preferably between 0.3 and 4 Ohms. More preferably, the electrical resistance of the heater assembly is between 0.5 and 3 Ohms, and more preferably about 1 Ohm.

Where the at least one heater element of the heater assembly comprises an array of electrically conductive filaments and the heater assembly further comprises electrically conductive contact portions for contacting the at least one heater element, the electrical resistance of the array of electrically conductive filaments is preferably at least an order of magnitude, and more preferably at least two orders of magnitude, greater than the electrical resistance of the contact portions. This ensures that the heat generated by passing current through the at least one heater element is localised to the plurality of electrically conductive filaments. It is generally advantageous to have a low overall resistance for the heater assembly if the cartridge is to be used with an aerosol-generating system powered by a battery. Minimizing parasitic losses between the electrical contacts and the filaments is also desirable to minimize parasitic power losses. A low resistance, high current system allows for the delivery of high power to the heater assembly. This allows the heater assembly to heat the electrically conductive filaments to a desired temperature quickly.

The electrically conductive contact portions may be fixed directly to the electrically conductive filaments. The contact portions may be positioned between the electrically conductive filaments and the electrically insulating substrate. For example, the contact portions may be formed from a copper foil that is plated onto the insulating substrate. The contact portions may also bond more readily with the filaments than the insulating substrate would.

Alternatively, the electrically conductive contact portions may be integral with the electrically conductive filaments of the heater elements. For example, the heater element may be formed by etching or electroforming of a conductive sheet to provide a plurality of filaments between two contact portions.

At least one heater element of the heater assembly may comprise at least one filament made from a first material and at least one filament made from a second material different from the first material. This may be beneficial for electrical or mechanical reasons. For example, one or more of the filaments may be formed from a material having a resistance that varies significantly with temperature, such as an iron aluminium alloy. This allows a measure of resistance of the filaments to be used to determine temperature or changes in temperature. This can be used in a puff detection system and for controlling heater temperature to keep it within a desired temperature range.

Preferably, the heater assembly is substantially flat.

The term "substantially flat" heater assembly is used to refer to a heater assembly that is formed in a single plane and not wrapped around or otherwise conformed to fit a curved or other non-planar shape. Thus, the substantially flat heater assembly extends in two dimensions along a surface substantially more than in a third dimension. In particular, the dimensions of the substantially flat heater assembly in the two dimensions within the surface are at least five times larger than in the third dimension, normal to the surface. A flat heater assembly can be easily handled during manufacture and provides for a robust construction.

The at least one heater element may be formed by joining together a plurality of electrically conductive filaments, for example by soldering or welding, to form a mesh. Preferably, the at least one heater element is formed by one of both of etching, for example wet etching, and electroforming. In both cases, a mask or mandrel may be used to create a specific pattern of apertures on the heater element. Advantageously, these processes are very accurate, making it possible to create heater elements with better controlled aperture sizes. This may improve the reproducibility of performance characteristics from heater to heater.

The aerosol-forming substrate is a substrate capable of releasing volatile compounds that can form an aerosol. The volatile compounds may be released by heating the aerosol forming substrate.

The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenised plant-based material. The aerosol-forming substrate may comprise homogenised tobacco material. The aerosol-forming substrate may comprise at least one aerosol-former. An aerosol-former is any suitable known compound or mixture of compounds that, in use, facilitates formation of a dense and stable aerosol and that is substantially resistant to thermal degradation at the operating temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as triethylene glycol, 1,3-butanediol and, most preferred, glycerine. The aerosol-forming substrate may comprise other additives and ingredients, such as flavourants.

According to a third aspect of the present invention, there is provided an aerosol-generating system comprising: an aerosol-generating device and a cartridge according to any of the embodiments described above, wherein the cartridge is removably coupled to the device, and wherein the device includes a power supply for the heater assembly.

As used herein, the cartridge being "removably coupled" to the device means that the cartridge and device can be coupled and uncoupled from one another without significantly damaging either the device or the cartridge.

The cartridge can be exchanged after consumption. As the cartridge holds the aerosol forming substrate and the heater assembly, the heater assembly is also exchanged regularly such that the optimal vaporization conditions are maintained even after longer use of the main unit.

The system may be an electrically operated smoking system. The system may be a handheld aerosol-generating system. The aerosol-generating system may have a size comparable to a conventional cigar or cigarette. The smoking system may have a total length between approximately 30 millimetres and approximately 150 millimetres. The smoking system may have an external diameter between approximately 5 millimetres and approximately 30 millimetres.

The system may further comprise electric circuitry connected to the heater assembly and to an electrical power source, the electric circuitry configured to monitor the electrical resistance of the heater assembly or of one or more filaments of the at least one heater element of the heater assembly, and to control the supply of power to the heater assembly from the power source dependent on the electrical resistance of the heater assembly or specifically the electrical resistance of the one or more filaments. By monitoring the temperature of the heater element, the system can prevent over- or underheating of the heater assembly and ensure that optimal vaporization conditions are provided.

The electric circuitry may comprise a microprocessor, which may be a programmable microprocessor, a microcontroller, or an application specific integrated chip (ASIC) or other electronic circuitry capable of providing control. The electric circuitry may comprise further electronic components. The electric circuitry may be configured to regulate a supply of power to the heater. Power may be supplied to the heater assembly continuously following activation of the system or may be supplied intermittently, such as on a puff by puff basis. The power may be supplied to the heater assembly in the form of pulses of electrical current.

The aerosol-generating device includes a power supply for the heater assembly of the cartridge. The power source may be a battery, such as a lithium iron phosphate battery, within the device. As an alternative, the power supply may be another form of charge storage device such as a capacitor. The power supply may require recharging and may have a capacity that allows for the storage of enough energy for one or more smoking experiences. For example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations of the heater.

The storage portion may be positioned on a first side of the heater assembly and an airflow channel positioned on an opposite side of the heater assembly to the storage portion, such that air flow past the heater assembly entrains vapourised aerosol-forming substrate.

According to a fourth aspect of the present invention, there is provided a method of manufacturing a cartridge for use in an aerosol-generating system, the method comprising the steps of: providing a storage portion comprising a housing having an opening; filling the storage portion with aerosol-forming substrate; and providing a heater assembly comprising at least one heater element extending across the opening of the housing, wherein the at least one heater element of the heater assembly has a plurality of apertures for allowing fluid to pass through the at least one heater element, and wherein the plurality of apertures have different sizes.

According to a fifth aspect of the present invention, there is provided a method of manufacturing a cartridge for use in an aerosol-generating system, the method comprising the steps of: providing a storage portion comprising a housing having an opening; filling the storage portion with aerosol-forming substrate; and providing a heater assembly comprising at least one heater element extending across the opening of the housing, wherein the at least one heater element of the heater assembly comprises an array of electrically conductive filaments extending along the length of the at least one heater element, and a plurality of electrically conductive transverse filaments extending transversely to the array of electrically conductive filaments and by which adjacent filaments in the array of electrically conductive filaments are connected, wherein interstices between the electrically conductive filaments and interstices between the electrically conductive transverse filaments define a plurality of apertures for allowing fluid to pass through the at least one heater element, and wherein at least some, preferably substantially all, of the plurality of electrically conductive transverse filaments extend across only part of the width of the at least one heater element and are staggered along the length of the at least one heater element.

Features described in relation to one or more aspects may equally be applied to other aspects of the invention. In particular, features described in relation to the cartridge of the first aspect may be equally applied to the cartridge of the second aspect, and vice versa, and features described in relation to the cartridges of either of the first and second aspects may equally apply to the methods of manufacture of the fourth and fifth aspects.

FIGS. 1A to 1D are schematic illustrations of an aerosol-generating system, including a cartridge in accordance with an embodiment of the invention. FIG. 1A is a schematic view of an aerosol-generating device 10, or main unit, and a separate cartridge 20, which together form the aerosol generating system. In this example, the aerosol-generating system is an electrically operated smoking system.

The cartridge 20 contains an aerosol-forming substrate and is configured to be received in a cavity 18 within the device. Cartridge 20 should be replaceable by a user when the aerosol-forming substrate provided in the cartridge is depleted. FIG. 1A shows the cartridge 20 just prior to insertion into the device, with the arrow 1 in FIG. 1A indicating the direction of insertion of the cartridge.

Figure 1B:
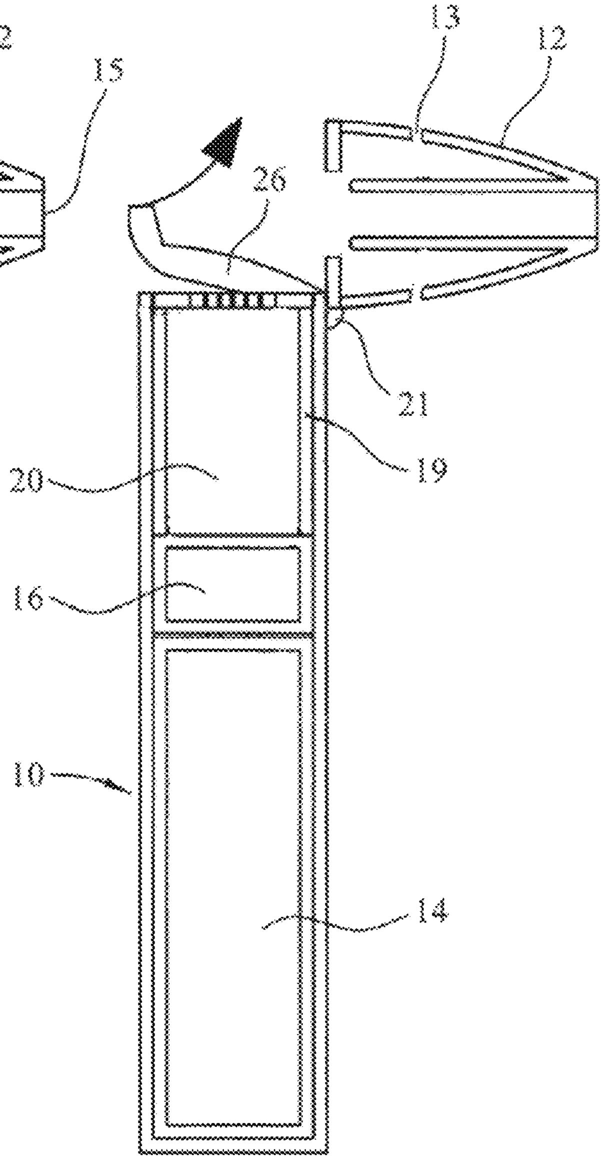
Figure 1C:
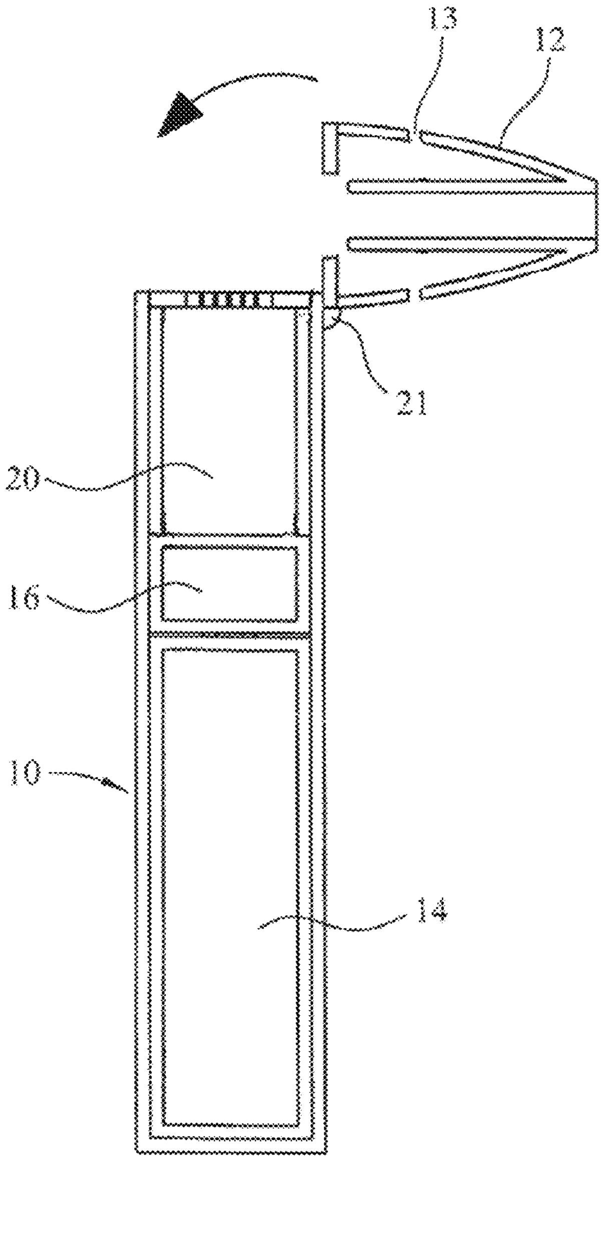
Figure 1D:
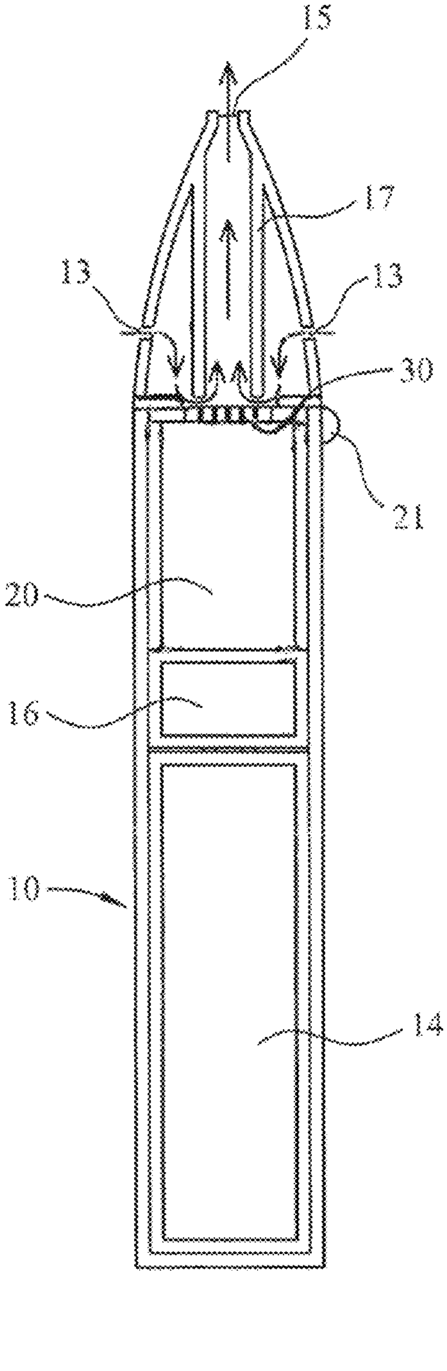

The aerosol-generating device 10 is portable and has a size comparable to a conventional cigar or cigarette. The device 10 comprises a main body 11 and a mouthpiece portion 12. The main body 11 contains a battery 14, such as a lithium iron phosphate battery, control electronics 16 and a cavity 18. The mouthpiece portion 12 is connected to the main body 11 by a hinged connection 21 and can move between an open position as shown in FIGS. 1A to 1C and a closed position as shown in FIG. 1D. The mouthpiece portion 12 is placed in the open position to allow for insertion and removal of cartridges 20 and is placed in the closed position when the system is to be used to generate aerosol, as will be described. The mouthpiece portion comprises a plurality of air inlets 13 and an outlet 15. In use, a user sucks or puffs on the outlet to draw air from the air inlets 13, through the mouthpiece portion to the outlet 15, and thereafter into the mouth or lungs of the user. Internal baffles 17 are provided to force the air flowing through the mouthpiece portion 12 past the cartridge, as will be described.

The cavity 18 has a circular cross-section and is sized to receive a housing 24 of the cartridge 20. Electrical connectors 19 are provided at the sides of the cavity 18 to provide an electrical connection between the control electronics 16 and battery 14 and corresponding electrical contacts on the cartridge 20.

FIG. 1B shows the system of FIG. 1A with the cartridge inserted into the cavity 18, and the cover 26 being removed. In this position, the electrical connectors rest against the electrical contacts on the cartridge, as will be described.

FIG. 1C shows the system of FIG. 1B with the cover 26 fully removed and the mouthpiece portion 12 being moved to a closed position.

FIG. 1D shows the system of FIG. 1C with the mouthpiece portion 12 in the closed position. The mouthpiece portion 12 is retained in the closed position by a clasp mechanism (not illustrated). It will be apparent to a person of ordinary skill in the art that other suitable mechanisms for retaining the mouthpiece in a closed position may be used, such as a snap fitting or a magnetic closure.

The mouthpiece portion 12 in a closed position retains the cartridge in electrical contact with the electrical connectors 19 so that a good electrical connection is maintained in use, whatever the orientation of the system is. The mouthpiece portion 12 may include an annular elastomeric element that engages a surface of the cartridge and is compressed between a rigid mouthpiece housing element and the cartridge when the mouthpiece portion 12 is in the closed position. This ensures that a good electrical connection is maintained despite manufacturing tolerances.

Of course other mechanisms for maintaining a good electrical connection between the cartridge and the device may, alternatively or in addition, be employed. For example, the housing 24 of the cartridge 20 may be provided with a thread or groove (not illustrated) that engages a corresponding groove or thread (not illustrated) formed in the wall of the cavity 18. A threaded engagement between the cartridge and device can be used to ensure the correct rotational alignment as well as retaining the cartridge in the cavity and ensuring a good electrical connection. The threaded connection may extend for only half a turn or less of the cartridge, or may extend for several turns. Alternatively, or in addition, the electrical connectors 19 may be biased into contact with the contacts on the cartridge.

Figure 2A:
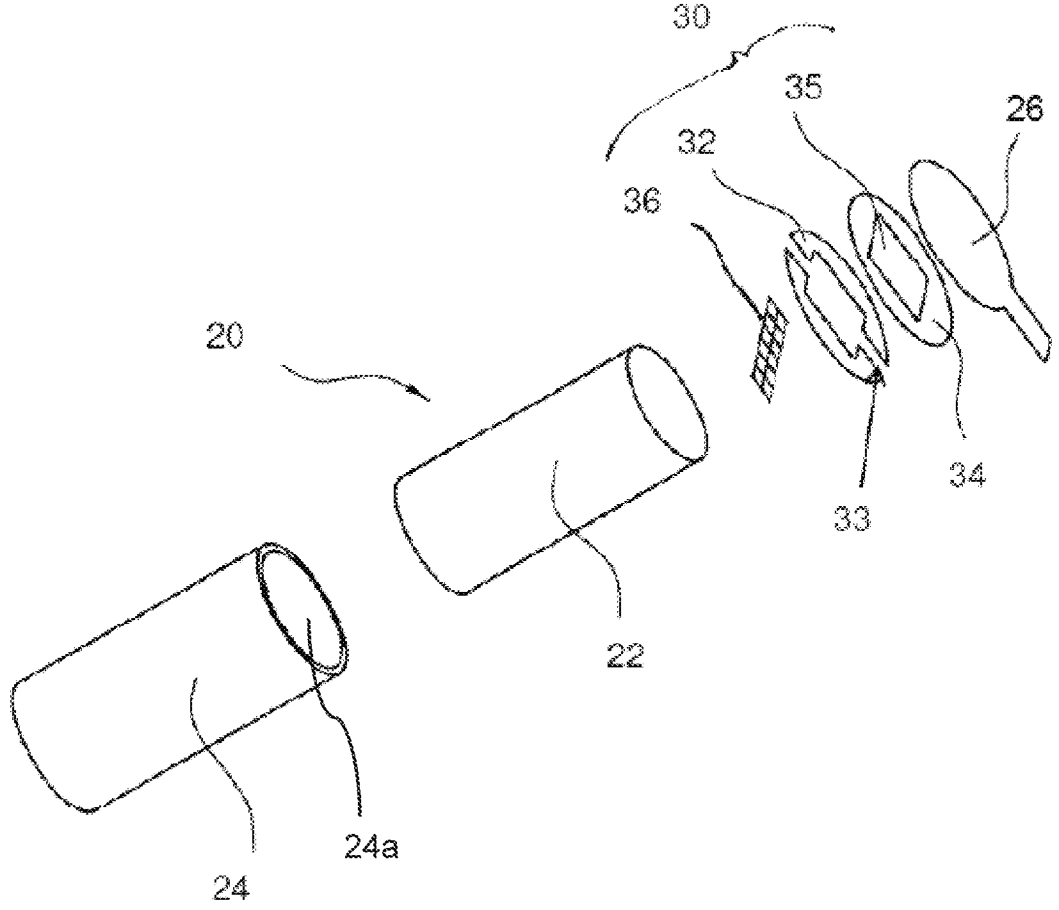
FIGS. 2A and 2B are exploded views of the cartridge of the system shown in FIG. 1.
Figure 2B:
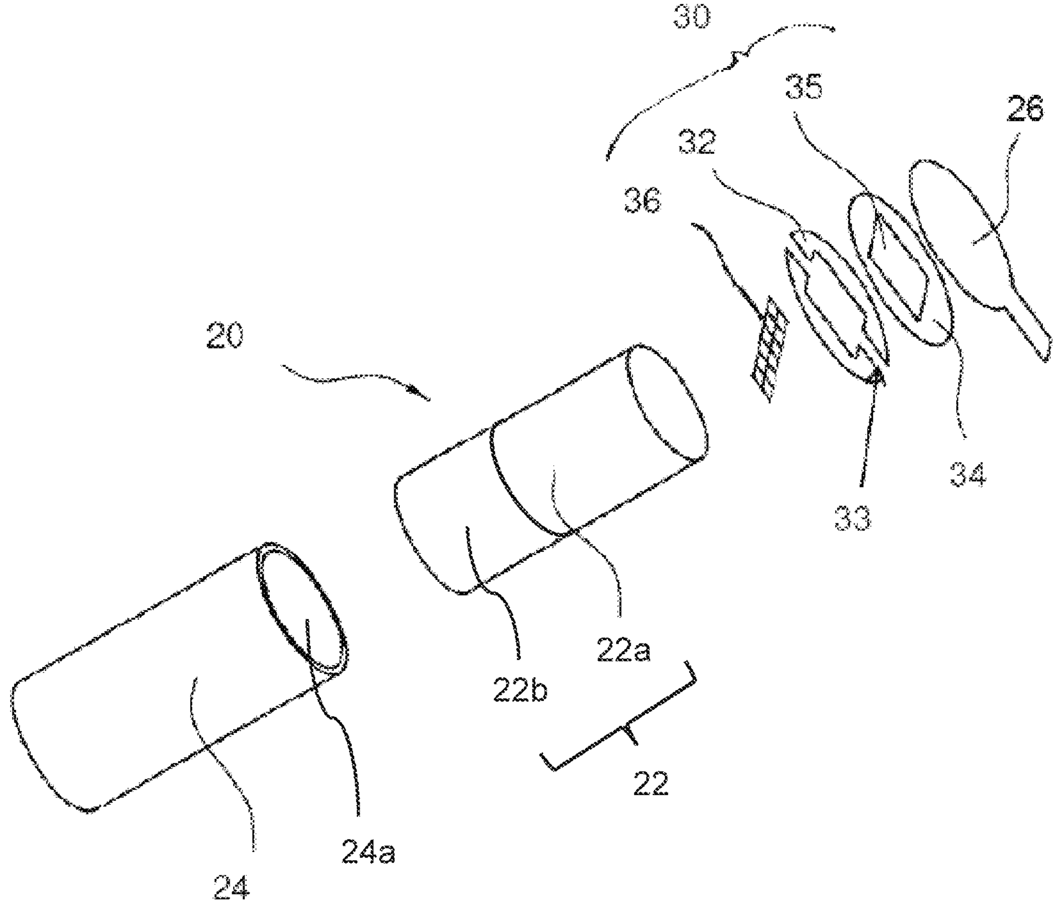

FIGS. 2A and 2B are exploded views showing a cartridge 20 suitable for use in an aerosol-generating system, for example an aerosol-generating system of the type of FIG. 1. The cartridge 20 comprises a generally circular cylindrical housing 24 that has a size and shape selected to be received into a corresponding cavity of, or mounted in an appropriate way with other elements of the aerosol-generating system, for example cavity 18 of the system of FIG. 1. The housing 24 contains an aerosol-forming substrate. In this example, the aerosol-forming substrate is a liquid and the housing 24 further contains a capillary material 22, as shown in FIG. 2A, that is soaked in the liquid aerosol-forming substrate. In this example the aerosol-forming substrate comprises 39 percent by weight glycerine, 39 percent by weight propylene glycol, 20 percent by weight water and flavourings, and 2 percent by weight nicotine. A capillary material is a material that actively conveys liquid from one end to another, and may be made from any suitable material. In this example the capillary material is formed from polyester. In other examples, the aerosol-forming substrate may be a solid.

The housing 24 has an open end, e.g., a first opening 24*a*, to which a heater assembly 30 is fixed. The heater assembly 30 comprises a substrate 34 having an opening 35 formed in it, a pair of electrical contacts 32 fixed to the substrate and separated from each other by a gap 33, and a heater element 36, formed from electrically conductive heater filaments, spanning the opening 35 and fixed to the electrical contacts 32 on opposite sides of the opening 35.

The heater assembly 30 is covered by a removable cover 26. The cover 26 comprises a liquid impermeable plastic sheet that is glued to the heater assembly but which can be easily peeled off. A tab is provided on the side of the cover 26 to allow a user to grasp the cover when peeling it off. It will now be apparent to one of ordinary skill in the art that although gluing is described as the method to a secure the impermeable plastic sheet to the heater assembly 30, other methods familiar to those in the art may also be used including heat sealing or ultrasonic welding, so long as the cover 26 may easily be removed by a consumer.

It will be understood that other cartridge designs are possible. For example, the capillary material with the cartridge may comprise two or more separate capillary materials, such as capillary material 22*a* and capillary material 22*b* as shown in FIG. 2B, or the cartridge may comprise a tank for holding a reservoir of free liquid.

The heater filaments of the heater element 36 are exposed through the opening 35 in the substrate 34 so that vapourised aerosol-forming substrate can escape into the airflow past the heater assembly.

In use, the cartridge 20 is placed in the aerosol-generating system, and the heater assembly 30 is contacted to a power source comprised in the aerosol-generating system. An electronic circuitry is provided to power the heater element 36 and to volatilize the aerosol-generating substrate.

Figure 3:
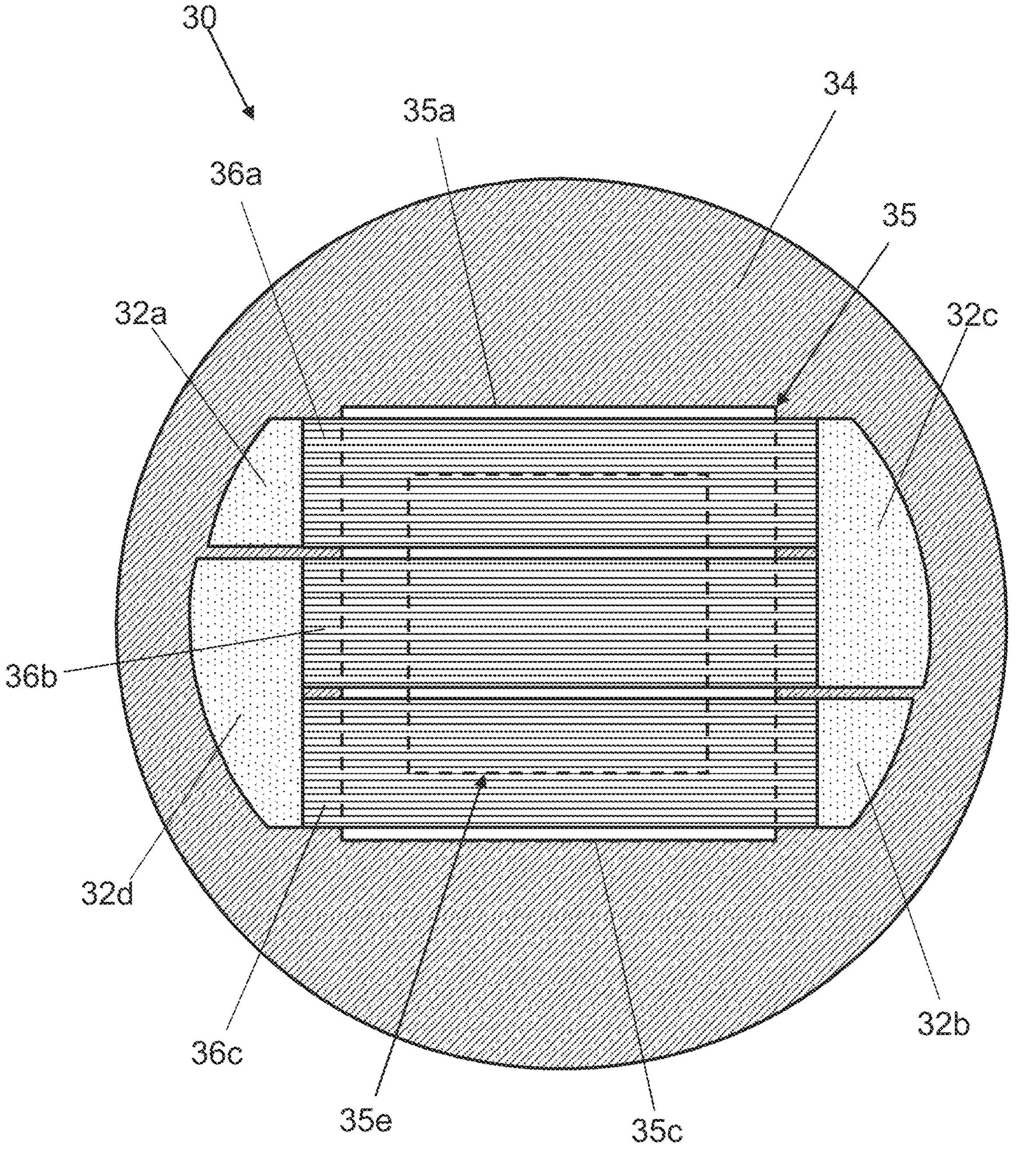
FIG. 3 shows a first example heater assembly with three heater elements.

In FIG. 3, a first example of the heater assembly 30 of the present invention is depicted, in which three substantially parallel heater elements 36*a*, 36*b*, 36*c* are electrically connected in series. The heater assembly 30 comprises an electrically insulating substrate 34 having a square opening 35 formed in it. The size of the opening is 5 millimetres×5 millimetres in this example, although it will be appreciated that other shapes and sizes of opening could be used as appropriate for the particular application of the heater. A first and a second electrically conductive contact portion 32*a*, 32*b* are provided at opposite sides of the opening 35 to allow contact with an external power supply. The first contact portion 32*a* contacts the first heater element 36*a* and the second contact portion 32*b* contacts the third heater element 36*c* of the three serially connected heater elements 36*a*, 36*b*, 36*c*. Two additional electrically conductive contact portions 32*c*, 32*d* are provided adjacent to the first and second contact portions 32*a*, 32*b* to allow for serial connection of the heater elements 36*a*, 36*b*, 36*c*. The first heater element 36*a* is connected between first contact portion 32*a* and additional contact portion 32*c*. The second heater element 36*b* is connected between additional contact portion 32*c* and additional contact portion 32*d*. The third heater element 36*c* is connected between additional contact portion 32*d* and the second contact portion 32*b*. In this embodiment the heater assembly 30 comprises an odd number of heater elements 36, namely three heater elements and the first and second contact portions 32*a*, 32*b* are located on opposite sides of the opening 35 of the substrate 34. Heater elements 36*a* and 36*c* are spaced from the side edges 35*a*, 35*c* of the opening such that there is no direct physical contact between these heater elements 36*a*, 36*c* and the insulating substrate 34. Without wishing to be bound by any particular theory, it is thought that this arrangement can reduces heat transfer to the insulating substrate 34 and can allow for effective volatilization of the aerosol-generating substrate.

Figure 4:
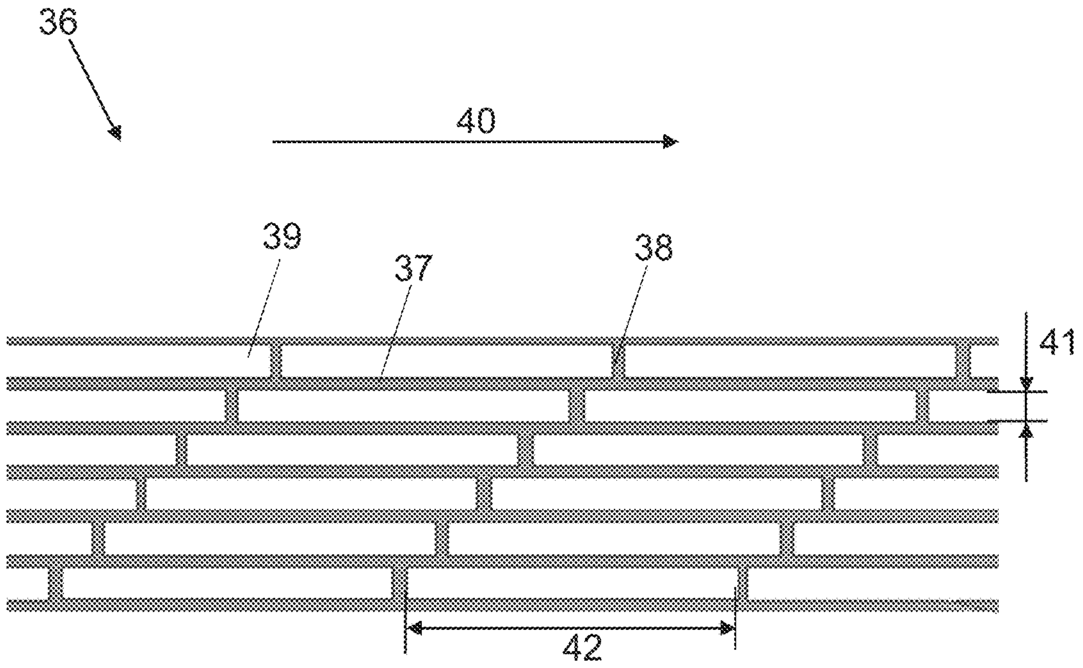
FIG. 4 shows an enlarged partial view of a first example heater element.

In this example, heater elements 36*a*, 36*b* and 36*c* each comprise a strip of electrically conductive material formed from an array of electrically conductive filaments, as discussed below in relation to FIGS. 4 and 5. The heater elements 36*a*, 36*b*, 36*c* each comprise a plurality of apertures (not shown) through which fluid may pass through the heater assembly 30. The size of the apertures may be substantially constant across the area of the opening 35, as depicted in FIG. 4. Alternatively, the size of the apertures may vary. For example, the size of the apertures in a central portion 35*e* of the opening 35 may be larger than the size of the apertures outside of the central portion 35*e*, as discussed in relation to FIG. 5. In some examples, heater element 36*b* defines a plurality of apertures having a different size to the plurality of apertures defined by heater elements 36*a* and 36*c*. For example, heater element 36*b* may define a plurality of apertures having a larger size than the plurality of apertures defined by heater elements 36*a* and 36*c*, In FIG. 4, an enlarged partial view of one of the heater elements of FIG. 3 is depicted. The heater element 36 comprises an array of electrically conductive filaments 37 extending along the length of the heater element 36 and a plurality of electrically conductive transverse filaments 38 extending substantially perpendicular to the filaments 37. The heater element 36 may be made from any suitable material, for example 316L stainless steel. The filaments 37 are connected together by the transverse filaments 38 to provide increased rigidity and strength to the heater element 36. The electrically conductive filaments 37 are substantially parallel and spaced apart such that interstices are defined between adjacent filaments 37. The electrically conductive transverse filaments 38 are also substantially parallel and spaced apart such that interstices are defined between adjacent transverse filaments 38. The interstices between the array of electrically conductive filaments 37 and the plurality of electrically conductive transverse filaments 38 define a plurality apertures 39 through which fluid may pass through the heater element 36. In this example, the interstices between axially adjacent transverse filaments 38 is greater than the interstices between adjacent filaments 37, such that each of the plurality of apertures 39 is elongate in the length direction of the heater element 36. In the arrangement shown in FIG. 4, the transverse filaments 38 each extend across only a single interstice between two adjacent filaments 37, with successive transverse filaments 38 across the width of the heater element 36 being staggered along the length of the heater element, that is, offset in the length direction of the heater element 36. With this arrangement, the junctions between the filaments 37 and transverse filaments 38 each define three electrical paths, one of which is in the general direction of current flowing through the heater element 36, as depicted by arrow 40, one is transverse to the general direction of current flow, and the other is in the opposition direction to the general direction of current flow. This is in contrast to a conventional criss-cross mesh in which the junctions between the filaments each define four electrical paths, one of which is in the general direction of current flowing through the heater element, two of which are transverse to the general direction of current flow, with the remainder being in the opposite direction to the general direction of current flow.

Without wishing to be bound by any particular theory, it is thought that by reducing the number of electrically conductive transverse elements and, thus the number of electrical paths, the heater element of the present invention can better maintain current direction across the heater element, resulting in a reduction in the variability in temperature profile across the heater element area, leading to fewer hot spots, and that this may reduce the variability in performance.

Additionally, by staggering the transverse filaments 38 along the length of the heater element, the unsupported length of each filament 37 is reduced. Thus, the length of the apertures can be increased without adversely affecting the strength or rigidity of the heater element. This may allow the fluid flow characteristics of the heater element and the aerosol delivery characteristics of the cartridge to be varied as desired without adversely affecting the rigidity or structural stability of the heater element.

In the partial view of the heater element depicted in FIG. 4, the size of the plurality of apertures 39 is substantially the same across the width and length of the portion of the heater element 36 shown, as indicated by width dimension 41 and length dimension 42. In this example, the apertures 39 are rectangular and each have a width of 58 microns and a length of 500 microns, although it will be appreciated that other shapes and sizes of aperture could be used as appropriate for the particular application of the heater. The conductive filaments 37, 38 from which the heater element 36 is formed each have a width and thickness of 20 microns, although it will be appreciated that other sizes of filament could be used as appropriate for the particular application of the heater. Although the portion of the heater element 36 shown in FIG. 4 is three apertures long by six apertures wide, the full heater element 36 may be longer and wider. In one example, the heater element is 12 apertures long by 21 apertures wide. Such a heater element has a total width of 1.658 millimetres (22×20 microns+21×58 microns) and a total length of 6.26 millimetres (13×20 microns+12×500 microns).

Figure 5:
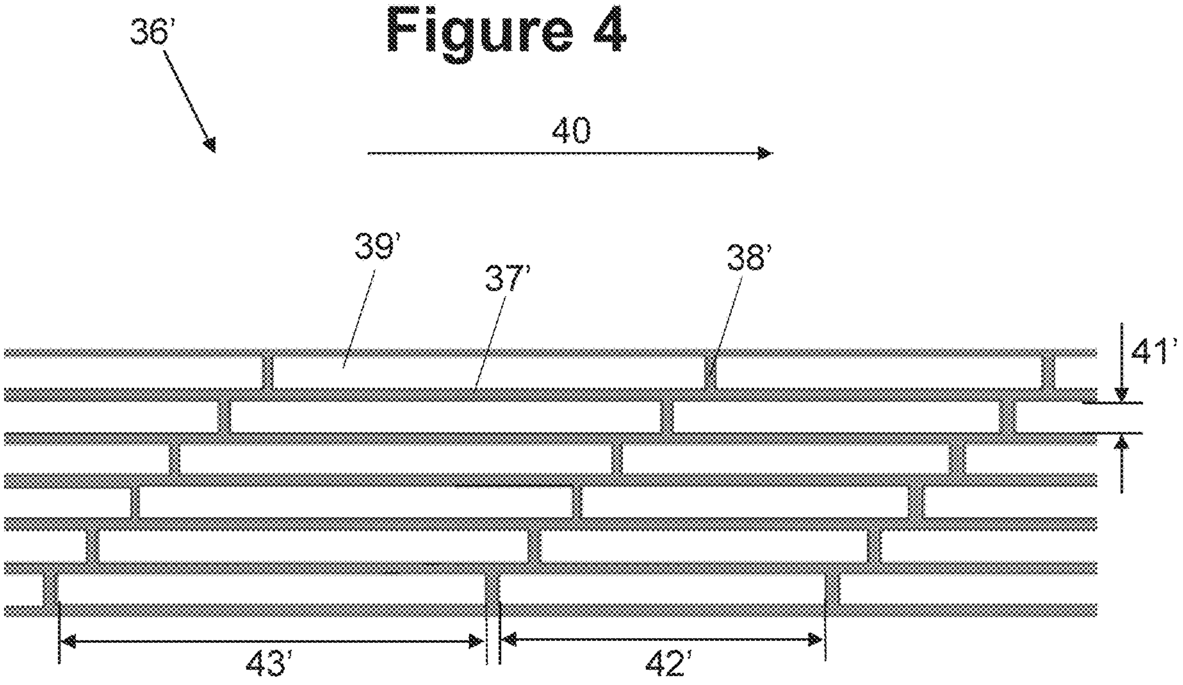
FIG. 5 shows an enlarged partial view of a second example heater element.

In FIG. 5, an enlarged partial view of an alternative example of heater element is depicted. The portion of heater element of FIG. 5 is similar to the portion of heater element shown in FIG. 4, with the exception that the size of the plurality of apertures 39' defined by the array of electrically conductive filaments 37' and the plurality of electrically conductive transverse filaments 38' varies across the length of the portion of heater element 36' shown. In particular, although the width of the apertures is substantially the same, as indicated by width dimension 41', the interstices between the transverse filaments is greater in a central portion of the heater element 36', such that the length 43', and thus the overall size, of the apertures 39' is greater in the centre portion of the heater element 36' than the length 42' of the apertures 39' outside of the centre portion. In this example, the apertures 39' in the central portion each have a width of 58 microns and a length of 600 microns.

Figure 6:
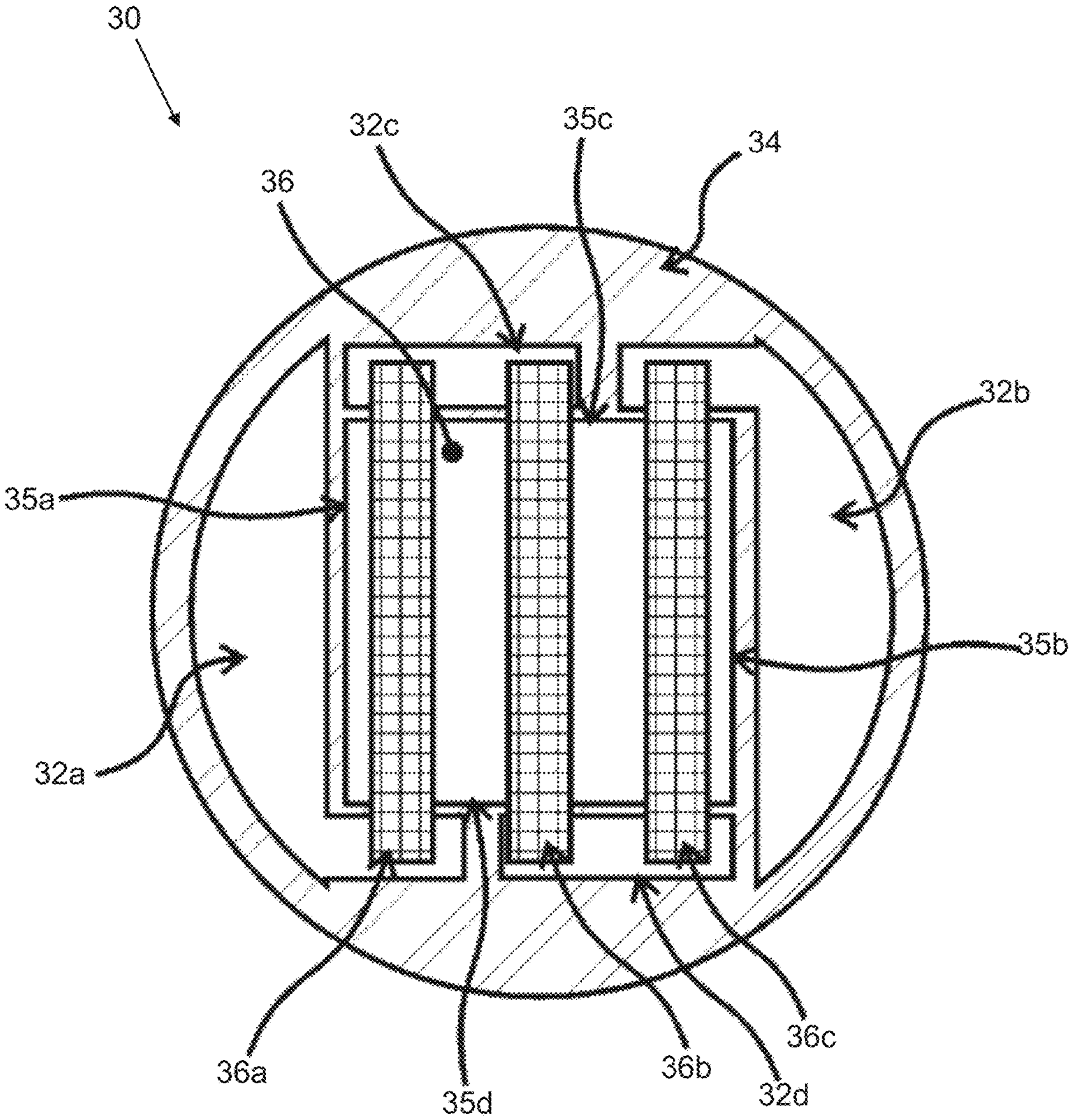
FIG. 6 shows a second example heater assembly with three heater elements.

In FIG. 6 a second example of the heater assembly 30 of the present invention is depicted, in which three substantially parallel heater elements 36*a*, 36*b*, 36*c* are electrically connected in series. The heater assembly 30 comprises an electrically insulating substrate 34 having a square opening 35 formed in it. The size of the opening is 5 millimetres×5 millimetres in this example, although it will be appreciated that other shapes and sizes of opening could be used as appropriate for the particular application of the heater. A first and a second electrically conductive contact portion 32*a*, 32*b* are provided at opposite sides of the opening 35 and extend substantially parallel to the side edges 35*a*, 35*b* of the opening 35. Two additional electrically conductive contact portions 32*c*, 32*d* are provided adjacent parts of opposing side edges 35*c*, 35*d* of the opening 35. The first heater element is connected between the first contact portion 32*a* and the additional contact portion 32*c*. The second heater element 36*b* is connected between additional contact portion 32*c* and additional contact portion 32*d*. The third heater element 36*c* is connected between additional contact portion 32*c* and the second contact portion 32*b*. In this embodiment the heater assembly 30 comprises an odd number of heater elements 36, namely three heater elements and the first and second contact portions 32*a*, 32*b* are located on opposite sides of the opening 35 of the substrate 34. Heater elements 36*a* and 36*c* are spaced from the side edges 35*a*, 35*b* of the opening such that there is no direct physical contact between these heater elements 36*a*, 36*c* and the insulating substrate 34. Without wishing to be bound by any particular theory, it is thought that this arrangement can reduces heat transfer to the insulating substrate 34 and can allow for effective volatilization of the aerosol-generating substrate.

Figure 7:
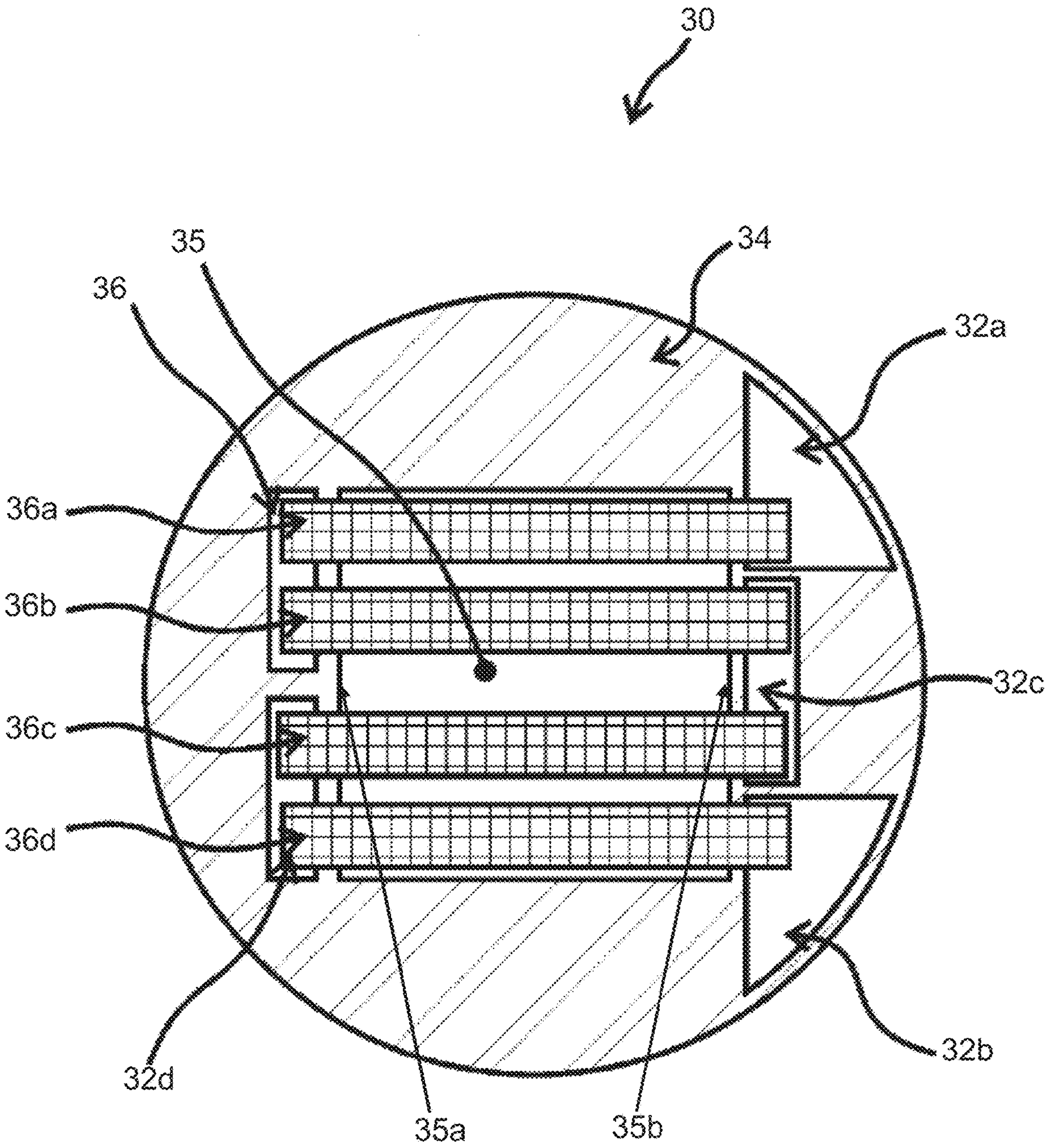
FIG. 7 shows a third example heater assembly with four heater elements.

In FIG. 7 a further example of the heater assembly 20 of the present invention is depicted, in which four heater elements 36*a*, 36*b*, 36*c*, 36*d* are electrically connected in series. The heater assembly 30 comprises an electrically insulating substrate 34 having a square opening 35 formed in it. The size of the opening is 5 millimetres×5 millimetres. A first and a second electrically conductive contact portion 32*a*, 32*b* is provided adjacent an upper and lower portion, respectively, of the same side edge 35*b* of the opening 35. Three additional electrically conductive contact portions 32*c*, 32*d*, 32*e* are provided, wherein two additional contact portions 32*d*, 32*e* are provided adjacent parts of opposing side edge 35*a*, and one additional contact portion 32*c* is provided parallel to side edge 35*b* between the first and second contact portions 32*a*, 32*b*. The four heater elements 36*a*, 36*b*, 36*c*, 36*d* are connected in series between the these five contact portions 32*a*, 32*c*, 32*d*, 32*e*, 32*b* as illustrated in FIG. 7. Again none of the long side edges of the heater elements is in direct physical contact with any of the side edges of the opening such that again heat transfer to the insulating substrate is reduced.

In this embodiment the heater assembly 30 comprises an even number of heater elements 36, namely four heater elements 36*a*, 36*b*, 36*c*, 36*d* and the first and second contact portions 32*a*, 32*b* are located on the same side of the opening 35 of the substrate 34.

In arrangements such as that shown in FIGS. 3, 6 and 7, the arrangement of the heater elements may be such that the gap between adjacent heater elements is substantially the same. For example, the heater elements may be regularly spaced across the width of the opening 35. In other arrangements, different spacings between the heater elements may be used, for example to obtain a desired heating profile. Other shapes of opening or of the heater elements may be used.

In the embodiments described above in relation to FIGS. 1 to 7, the heater assembly comprises one or more heater elements comprising a plurality of heater filaments and transverse heater filaments formed from a conductive sheet of 316L stainless steel foil that is etched or electroformed to define the filaments. The filaments have a thickness and a width of around 20 microns. The heater elements are connected to electrical contacts 32 that are separated from each other by a gap of about 100 microns and are formed from a copper foil having a thickness of around 30 microns. The electrical contacts 32 are provided on a polyimide substrate 34 having a thickness of about 120 microns. The contact portions are preferably plated, for example with gold, tin, or silver. The filaments forming the heater elements are spaced apart to define interstices between the adjacent filaments and the transverse filaments forming the heater elements are also spaced apart to define interstices between adjacent transverse filaments. The interstices between the adjacent filaments and the transverse filaments define a plurality of apertures through which fluid may pass through the heater assembly. The plurality of apertures in this example have a width of around 58 microns, and a length which varies across the length, width, or length and width of the heater element, for example between 500 microns and 600 microns, although larger or smaller apertures may be used. Using a heater element with these approximate dimensions may allow in some examples a meniscus of aerosol-forming substrate to be formed in the apertures, and for the heater element of the heater assembly to draw aerosol-forming substrate by capillary action. The open area of the heater element, that is, the ratio of the area of the plurality of apertures to the total area of the heater element is advantageously between 25 percent and 56 percent. The total resistance of the heater assembly is around 1 Ohm. The filaments of the heater elements provide the vast majority of this resistance so that the majority of the heat is produced by the filaments. In certain examples, the filaments of the heater element have an electrical resistance more than 100 times higher than the electrical contacts 32.

The substrate 34 is electrically insulating and, in this example, is formed from a polyimide sheet having a thickness of about 120 microns. The substrate is circular and has a diameter of 8 millimetres. The heater element is rectangular and in some examples has side lengths of 5 millimetres and 1.6 millimetres. These dimensions allow for a complete system having a size and shape similar to a convention cigarette or cigar to be made. Another example of dimensions that have been found to be effective is a circular substrate of diameter 5 millimetres and a rectangular heater element of 1 millimetre×4 millimetres.

The heater elements may be bonded directly to the substrate 34, the contacts 32 then being bonded at least partially on top the heater elements. Having the contacts as an outermost layer can be beneficial for providing reliable electrical contact with a power supply. The plurality of filaments may be integrally formed with the electrically conductive contact portions.

In the cartridge shown in FIGS. 2A and 2B, the contacts 32 and heater elements 36 are located between the substrate layer 34 and the housing 24. However, it is possible to mount the heater assembly to the cartridge housing the other way up, so that the polyimide substrate 34 is directly adjacent to the housing 24.

Although the embodiments described have cartridges with housings having a substantially circular cross section, it is of course possible to form cartridge housings with other shapes, such as rectangular cross section or triangular cross section. These housing shapes would ensure a desired orientation within the corresponding shaped cavity, to ensure the electrical connection between the device and the cartridge.

The capillary material 22 is advantageously oriented in the housing 24 to convey liquid to the heater assembly 30. When the cartridge is assembled, the heater filaments 37, 38 may be in contact with the capillary material 22 and so aerosol-forming substrate can be conveyed directly to the heater. In examples of the invention, the aerosol-forming substrate contacts most of the surface of each filament 37, 38 so that most of the heat generated by the heater assembly passes directly into the aerosol-forming substrate. In contrast, in conventional wick and coil heater assemblies only a small fraction of the heater wire is in contact with the aerosol-forming substrate. The capillary material 27 may extend into the apertures.

In use the heater assembly preferably operates by resistive heating, although it may also operate using other suitable heating processes, such as inductive heating. Where the heater assembly operates by resistive heating, current is passed through the filaments 37, 38 of the heater elements 36 under the control of control electronics 16, to heat the filaments to within a desired temperature range. The filaments have a significantly higher electrical resistance than the contact portions 32 so that the high temperatures are localised to the filaments. The system may be configured to generate heat by providing electrical current to the heater assembly in response to a user puff or may be configured to generate heat continuously while the device is in an "on" state. Different materials for the filaments may be suitable for different systems. For example, in a continuously heated system, graphite filaments are suitable as they have a relatively low specific heat capacity and are compatible with low current heating. In a puff actuated system, in which heat is generated in short bursts using high current pulses, stainless steel filaments, having a high specific heat capacity may be more suitable.

In a puff actuated system, the device may include a puff sensor configured to detect when a user is drawing air through the mouthpiece portion. The puff sensor (not illustrated) is connected to the control electronics 16 and the control electronics 16 are configured to supply current to the heater assembly 30 only when it is determined that the user is puffing on the device. Any suitable air flow sensor may be used as a puff sensor, such as a microphone.

In a possible embodiment, changes in the resistivity of one or more of the filaments 37, 38 or of the heater element as a whole may be used to detect a change in the temperature of the heater element. This can be used to regulate the power supplied to the heater element to ensure that it remains within a desired temperature range. Sudden changes in temperature may also be used as a means to detect changes in air flow past the heater element resulting from a user puffing on the system. One or more of the filaments may be dedicated temperature sensors and may be formed from a material having a suitable temperature coefficient of resistance for that purpose, such as an iron aluminium alloy, Ni—Cr, platinum, tungsten or alloy wire.

The air flow through the mouthpiece portion when the system is used is illustrated in FIG. 1*d*. The mouthpiece portion includes internal baffles 17, which are integrally moulded with the external walls of the mouthpiece portion and ensure that, as air is drawn from the inlets 13 to the outlet 15, it flows over the heater assembly 30 on the cartridge where aerosol-forming substrate is being vapourised. As the air passes the heater assembly, vapourised substrate is entrained in the airflow and cools to form an aerosol before exiting the outlet 15. Accordingly, in use, the aerosol-forming substrate passes through the heater assembly by passing through the interstices between the filaments 36, 37, 38 as it is vapourised.

Other cartridge designs incorporating a heater assembly in accordance with this disclosure can now be conceived by one of ordinary skill in the art. For example, the cartridge may include a mouthpiece portion, may include more than one heater assembly and may have any desired shape. Furthermore, a heater assembly in accordance with the disclosure may be used in systems of other types to those already described, such as humidifiers, air fresheners, and other aerosol-generating systems.

The exemplary embodiments described above illustrate but are not limiting. In view of the above discussed exemplary embodiments, other embodiments consistent with the above exemplary embodiments will now be apparent to one of ordinary skill in the art.

The invention claimed is:

1. A cartridge for an aerosol-generating system, the cartridge comprising:

a liquid storage portion comprising a housing with a first opening, the housing configured to contain a liquid aerosol-forming substrate;

a capillary material having first and second faces; and a heater assembly comprising an electrically insulating support having a second opening, an electrical heating element supported by the electrically insulating support and being configured to heat the liquid aerosol-forming substrate to form an aerosol, and first and second electrically conductive contact portions disposed at opposite sides of the second opening and being configured to connect to electrical connectors of a battery configured to supply power to the heater assembly, wherein the heater assembly is connected to the housing of the liquid storage portion, and wherein the first face of the capillary material is in physical contact with the electrical heating element and the second face of the capillary material is opposite the first face of the capillary material, the capillary material being configured to convey the liquid aerosol-forming substrate to the electrical heating element by capillary action.

2. The cartridge according to claim 1, wherein a width of the electrical heating element is less than a width of the second opening in at least a region of the second opening.

3. The cartridge according to claim 2, wherein the width of the electrical heating element is less than the width of the second opening in all of the second opening.

4. The cartridge according to claim 1, wherein the electrical heating element extends across a full length dimension of the second opening.

5. The cartridge according to claim 1, wherein there is no direct physical contact between the electrical heating element and the insulating support.

6. The cartridge according to claim 1, wherein the electrical heating element defines a plurality of apertures configured to allow fluid to pass through the electrical heating element.

7. The cartridge according to claim 6, wherein each of the plurality of apertures is elongate in a length direction of the electrical heating element.

8. The cartridge according to claim 6, wherein the electrical heating element comprises a sheet of electrically conductive material in which the apertures are formed.

9. The cartridge according to claim 1, wherein the capillary material has a fibrous or spongy structure.

10. The cartridge according to claim 1, wherein the cartridge comprises two or more capillary materials.

11. The cartridge according to claim 10, wherein the cartridge further comprises a first capillary material, in contact with the electrical heating element, and a second capillary material in contact with the first capillary material but not in contact with the electrical heating element.

12. The cartridge according to claim 11, wherein the first capillary material has a higher thermal decomposition temperature than the second capillary material.

13. The cartridge according to claim 1, wherein the cartridge comprises a plurality of electrical heating elements.

14. The cartridge according to claim 13, wherein the plurality of heating elements are connected in series.

15. A method of manufacturing a cartridge according to claim 1, the method comprising:

providing the liquid storage portion;

filling the liquid storage portion with the aerosol-forming substrate; and providing the heater assembly.

16. The method of manufacturing according to claim 10, wherein the electrical heating element extends across the first opening of the housing.

17. The method of manufacturing according to claim 10, wherein the electrical heating element has a plurality of apertures configured to allow fluid to pass through the electrical heating element.

18. An aerosol-generating system, comprising:

an aerosol-generating device comprising a power source; and a cartridge according to claim 1, wherein the cartridge is removably coupled to the aerosol-generating device, and wherein the power source of the aerosol-generating device is a battery and is configured to supply power to the heater assembly of the cartridge.

* * * * *